United States Patent [19]

Hsu

[11] Patent Number: 5,938,774
[45] Date of Patent: Aug. 17, 1999

[54] APPARATUS FOR REPAIRING FAULTY PROGRAM SEGMENTS IN EMBEDDED MICROPROCESSOR SYSTEMS

[75] Inventor: Rong-Fu Hsu, Hsinchu, Taiwan

[73] Assignee: Winbond Electronics Corp., Taiwan

[21] Appl. No.: 08/941,024

[22] Filed: Sep. 30, 1997

[30] Foreign Application Priority Data

Jul. 8, 1997 [TW] Taiwan ................................. 86109557

[51] Int. Cl.$^6$ ............................................... G06F 11/00
[52] U.S. Cl. ................................. 714/6; 714/8; 714/10; 714/42
[58] Field of Search ........................ 714/6, 10, 8; 713/2; 710/13, 240

[56] References Cited

U.S. PATENT DOCUMENTS

| | | | |
|---|---|---|---|
| 4,601,031 | 7/1986 | Walker et al. | 371/10 |
| 5,327,531 | 7/1994 | Bealkowski et al. | 395/164 |
| 5,471,674 | 11/1995 | Stewart et al. | 710/13 |
| 5,757,690 | 5/1998 | McMahon | 365/104 |
| 5,793,943 | 8/1998 | Noll | 714/6 |
| 5,794,054 | 8/1998 | Le et al. | 710/240 |
| 5,815,706 | 9/1998 | Stewart et al. | 713/2 |
| 5,831,988 | 11/1998 | Fagerness | 714/42 |
| 5,835,695 | 11/1998 | Noll | 714/6 |
| 5,870,520 | 2/1999 | Lee et al. | 714/6 |
| 5,870,601 | 2/1999 | Getzlaff et al. | 712/244 |

Primary Examiner—Hassan Kizou
Assistant Examiner—Nguyen Xuan Nguyen
Attorney, Agent, or Firm—Rabin & Champagne, P.C.

[57] ABSTRACT

A program repairing apparatus is provided for use on an embedded microprocessor system to repair any faulty program segments that are stored in a permanent data storage unit, such as a mask ROM (read-only memory) incorporated in the embedded microprocessor system. These faulty program segments are repaired by using a number of repair program segments loaded in a reloadable storage unit, such as a RAM (random-access memory) unit that represent the correct versions of the faulty program segments. With this program repairing apparatus, the programs stored in the ROM unit can be repaired without carrying out a mask programming process. In this program repairing apparatus, the starting addresses of the faulty program segments in the ROM unit are registered in a faulty-segment address table and the starting addresses of the repair program segments in the RAM unit are registered in a repair-segment address table. When the current access address is the starting address of any one of the faulty program segments, a comparison circuit and a multiplexer are used in conjunction to change the access address to the starting address of the corresponding repair program segment in the RAM unit. This allows the embedded microprocessor system to execute the program codes in the repair program segment instead of the faulty program codes in the faulty program segment.

14 Claims, 5 Drawing Sheets

APPARATUS FOR REPAIRING FAULTY PROGRAM SEGMENTS IN EMBEDDED MICROPROCESSOR SYSTEMS

BACKGROUND OF THE INVENTION

1. Field of the Invention

This invention relates to embedded microprocessor systems, and more particularly, to a program repairing apparatus for use on an embedded microprocessor system to repair any faulty program segments that are stored in a permanent data storage unit, such as a mask ROM (read-only memory) incorporated in the embedded microprocessor system.

2. Description of Related Art

Conventionally, microprocessor systems are constructed by manufacturing microprocessors, memory units, and I/O (input/output) devices as individual units in separate IC devices and then mounting these IC devices on printed circuit boards (PCB). With the advance in semiconductor technologies, however, today's microprocessor systems can be constructed all on a single semiconductor chip. Such a microprocessor system is usually referred to as an embedded microprocessor system.

FIG. 1 is a schematic block diagram of the core microprocessor of a conventional embedded microprocessor system. As shown, the embedded microprocessor system includes a ROM (read-only memory) unit 800, a program counter 81, a decoding unit 82, an execution unit 83, and a control unit 84. The ROM unit 800 is used for permanent storage of routinely executed programs by the execution unit 83. The sequential output of the program counter 81 is used as access addresses to gain access to specific storage locations in the ROM unit 800 so as to read out the corresponding program codes from the same. The program codes from the ROM unit 800 are subsequently processed by the decoding unit 82 so as to convert it into suitable form that can be executed by the execution unit 83. During execution of the program, the execution unit 83 can change the output of the program counter 81 in response to various conditions so as to fetch certain special program routines located on specific addresses of the ROM unit 800. All of the foregoing actions are under control by the control unit 84. Detailed structures and functions of this embedded microprocessor system are all conventional so description thereof will not be further detailed.

The ROM unit in an embedded microprocessor system is usually realized by a mask ROM since the cost of mask ROMs are significantly cheaper than other kinds of non-volatile memories. The program codes are permanently written into the mask ROM through the so-called mask programming process that requires to manufacture a mask layer first, then uses the mask layer in a semiconductor manufacturing process to complete the building of the program codes in the mask ROM. Once stored, the program codes can not be arbitrarily modified or updated unless another mask programming process is performed on the mask ROM. However, the use of the mask programming process to modify or update programs stored in the mask ROM is quite a laborious and time-consuming process to carry out. Finished products of embedded microprocessor systems may be discarded because the program codes stored in the mask ROM have bugs. There exists, therefore, a need for a program repairing apparatus which can repair any faulty program segments in the ROM unit of an embedded microprocessor system without the use of mask programming process.

SUMMARY OF THE INVENTION

It is therefore a primary objective of the present invention to provide a program repairing apparatus which is capable of repairing any faulty program segments that are stored in a mask ROM unit incorporated in an embedded microprocessor system without having to perform a further mask programming process on the mask ROM unit.

It is another objective of the present invention to provide a program repairing apparatus which can easily repair any faulty program segments that are stored in a mask ROM unit incorporated in an embedded microprocessor system through the use of repair program segments stored in a RAM unit.

In accordance with the foregoing and other objectives of the present invention, a program repairing apparatus is provided for use on an embedded microprocessor system to repair any faulty program segments that are stored in a permanent data storage unit incorporated in the embedded microprocessor system.

The program repairing apparatus of the invention includes the following constituent elements:

(a) reloadable storage means, such as a RAM unit, for storing a corresponding number of repair program segments which are used respectively to repair the faulty program segments in the ROM unit;

(b) a faulty-segment address table for registering the starting addresses of the faulty program segments in the ROM unit;

(c) a repair-segment address table for registering the starting addresses of the repair program segments in the reloadable storage means;

(d) a program counter for generating a sequential output of binary values serving as access addresses to the ROM unit and the reloadable storage means;

(e) a comparison circuit for comparing the output of the program counter with each of the starting addresses of the faulty program segments registered in the faulty-segment address table; if all comparison results are unequal, the comparison circuit generating a first selection control signal; otherwise, if one comparison result is equal, the comparison circuit generating a second selection control signal and a repair-segment selection signal, the repair-segment selection signal causing the repair-segment address table to output the starting address of the corresponding repair program segment needed to repair the current faulty program segment; and (f) a multiplexer having a first input end connected to receive the output of the program counter and a second input end connected to receive the output of the repair-segment address table, the multiplexer being coupled to the comparison circuit such that the appearance of the first selection control signal causes the multiplexer to select the output of the program counter as output while the appearance of the second selection control signal causes the multiplexer to select the output of the repair-segment address table as output; the output of the multiplexer being used as an access address to gain access to the ROM unit and the reloadable storage means.

Further, the foregoing comparison circuit includes the following constituent elements:

(a) a plurality of digital comparators, each being used to compare one of the starting addresses of the faulty program segments registered in the faulty-segment address table with the current output of the program counter; the output of each digital comparator being at a first logic state if the comparison result is unequal and at a second logic state if equal; and (b) a logic-OR gate having a plurality of input ends connected respectively to receive the output of each of the digital comparators;

wherein when the output of each of the digital comparators is at the first logic state, the output of the logic-OR gate represents the first selection control signal; whereas when the output of any one of the digital comparators is at the second logic state, the output of the logic-OR gate represents the second selection control signal.

With the program repairing apparatus of the invention, any program segments in the ROM unit that need to be corrected or updated can be repaired by using modified versions of the faulty program segments which are loaded in the RAM unit. Since these reloadable repair program segments can be arbitrarily modified at any time, the repair work on the faulty program segments in the ROM unit is easy and convenient to carry out. The embedded microprocessor system will therefore not suffer from shutdown due to any faulty program segments in the ROM unit. Moreover, these faulty program segments, if any, can be repaired easily simply by loading the repair program segments into the RAM unit, without having to replace the whole ROM unit with a new one that contains the correct programs.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
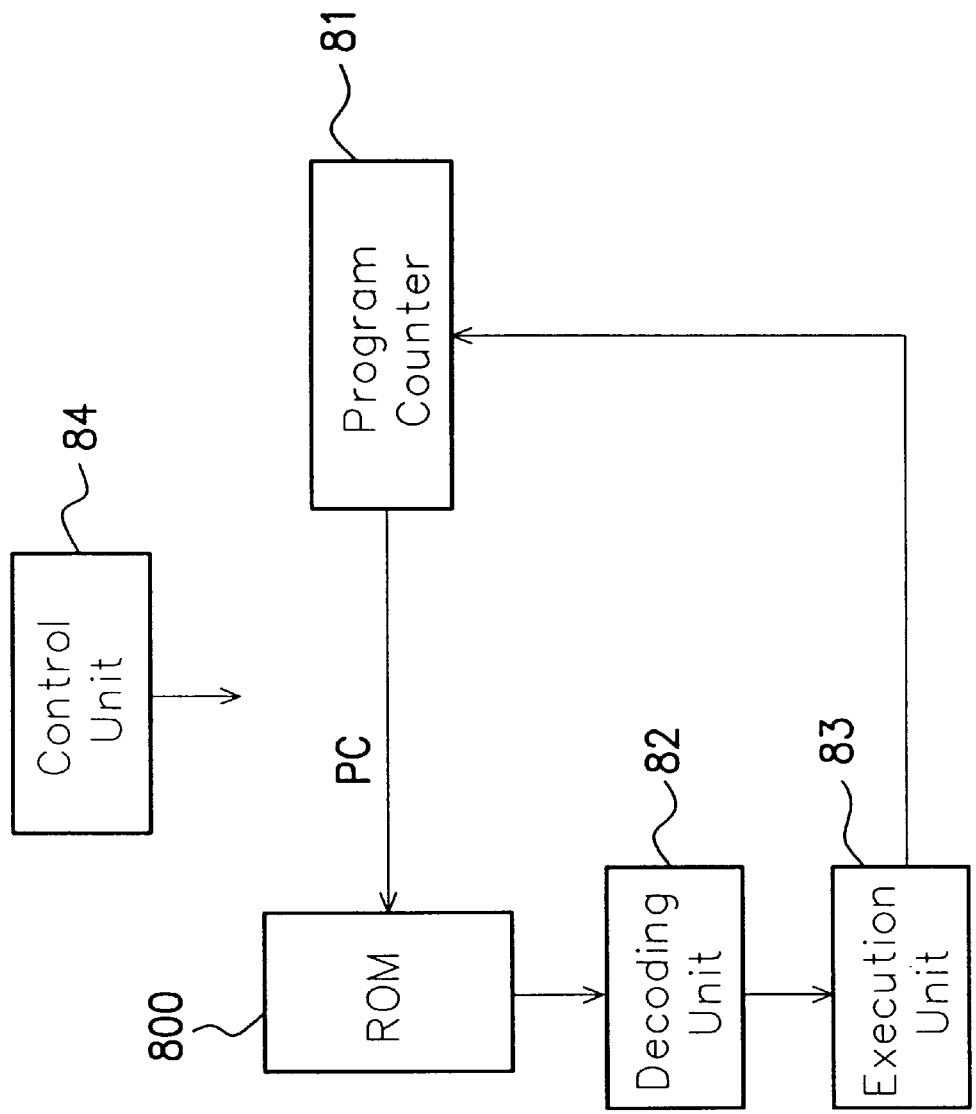
FIG. 1 is a schematic block diagram of the core microprocessor of a conventional embedded microprocessor system.
Figure 2:
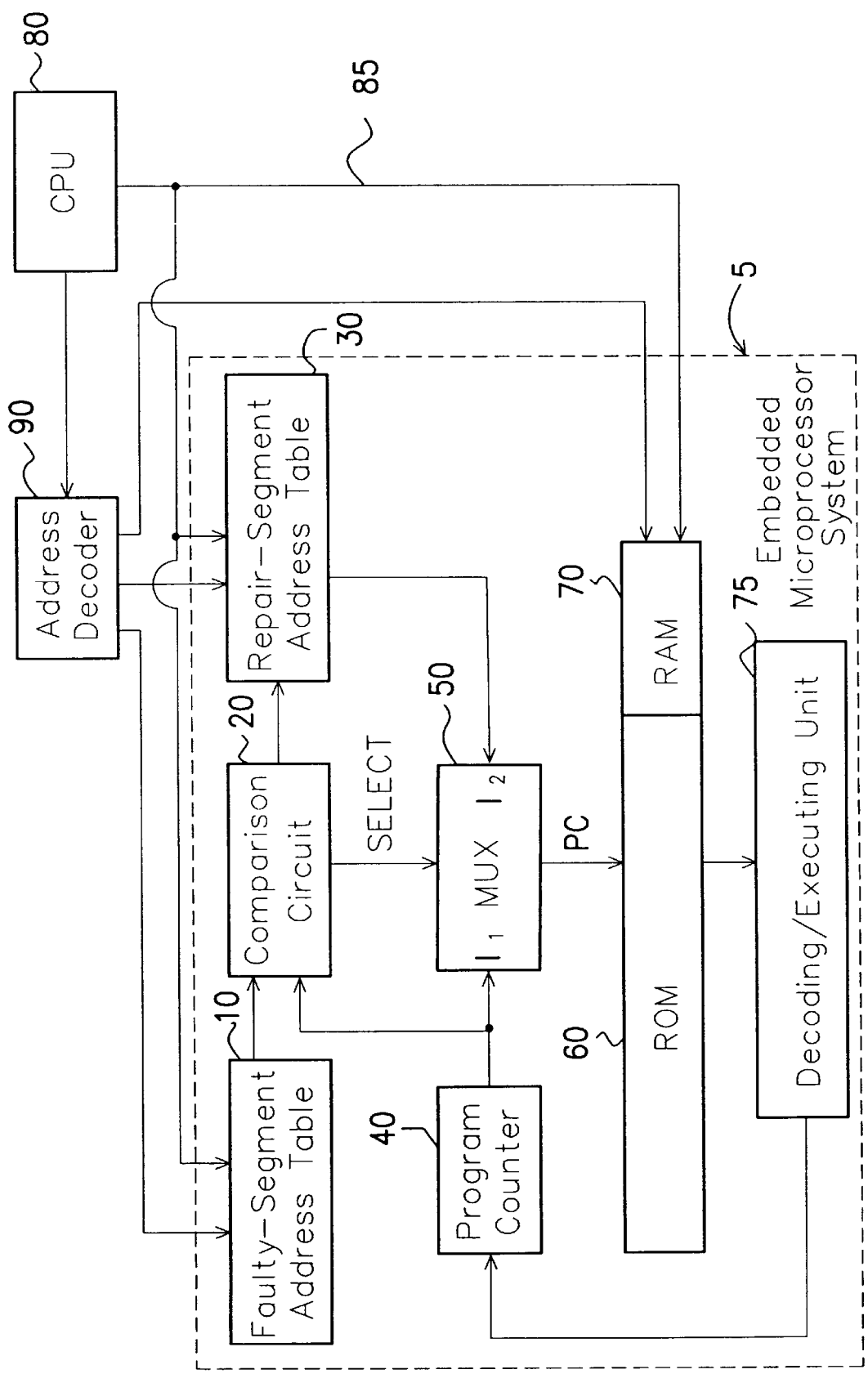
FIG. 2 is a schematic block diagram of an embedded microprocessor system which is provided with the program repairing apparatus according to the invention.

FIG. 2 is a schematic block diagram of an embedded microprocessor system which is provided with the program repairing apparatus according to the invention. In FIG. 2, the dashed box indicated by the reference numeral 5 indicates an embedded microprocessor system which is provided with the program repairing apparatus of the invention. As shown, the embedded microprocessor system 5 includes a faulty-segment address table 10, a comparison circuit 20, a repair-segment address table 30, a program counter 40, a multiplexer (MUX) 50, a ROM (read-only memory) unit 60, a RAM (random-access memory) unit 70, and a decoding/executing unit 75. Further, a CPU (central processing unit) 80 and an address decoder 90 is externally coupled to the embedded microprocessor system 5 for performing required data write-in respectively to the faulty-segment address table 10, the repair-segment address table 30, and the RAM unit 70, as will be described in full detail later in this section.

The ROM unit 60 is used for permanent storage of some routinely executed programs of the embedded microprocessor system, which is customarily a mask ROM. The data stored in the ROM unit 60 can not be arbitrarily modified. The program codes stored in the ROM unit 60 are executed by the decoding/executing unit 75. Whenever any segments of the program codes stored in the ROM unit 60 are found to be faulty or need to be updated, they can be repaired by using the correct versions of program segments which can be loaded into the RAM unit 70 under control by the CPU 80.

Whenever the embedded microprocessor system finds that there are faulty program segments in the ROM unit 60, the starting address of each of these faulty program segments will be registered in the faulty-segment address table 10. Correspondingly, the repair program segments that are used to repair these faulty program segments are loaded into the RAM unit 70; and the starting address of each of these repair program segments is registered in the repair-segment address table 30.

The CPU 80 can use the address decoder 90 and data bus 85 to perform the following three tasks: (1) storing the starting address of each of the faulty program segments in the ROM unit 60 into the faulty-segment address table 10; (2) loading the corresponding repair program segments of these faulty program segments into the RAM unit 70; and (3) storing the starting address of each of the repair program segments in the RAM unit 70 into the repair-segment address table 30. In practice on an application system, these three tasks can be carried out by using a system controller, which is realized by the CPU 80 and address decoder 90, to perform an on-line programming of data respectively into the faulty-segment address table 10, the repair-segment address table 30, and the RAM unit 70.

The program counter 40 can generate a sequential output of binary values that are used as access addresses to gain access to specific locations in the ROM unit 60 and RAM unit 70 so as to fetch out the program codes stored therein for the decoding/executing unit 75 to execute.

The multiplexer 50 has two input ends $I_1$, $I_2$ which are respectively connected to receive the output of the program counter 40 and the output of the repair-segment address table 30. Further, the multiplexer 50 is coupled to the comparison circuit 20 in such a manner that when the comparison circuit 20 outputs SELECT=0, the multiplexer 50 will select the input value at its input end $I_1$ as its output (i.e., the output of the program counter 40); whereas when SELECT=1, the multiplexer 50 will select the input value at its input end $I_2$ as its output (i.e., the starting address of a selected repair program segment from the repair-segment address table 30). The output of the multiplexer 50 is denoted by PC whose value serves an access address to the ROM unit 60 and RAM unit 70.

Figure 3A:
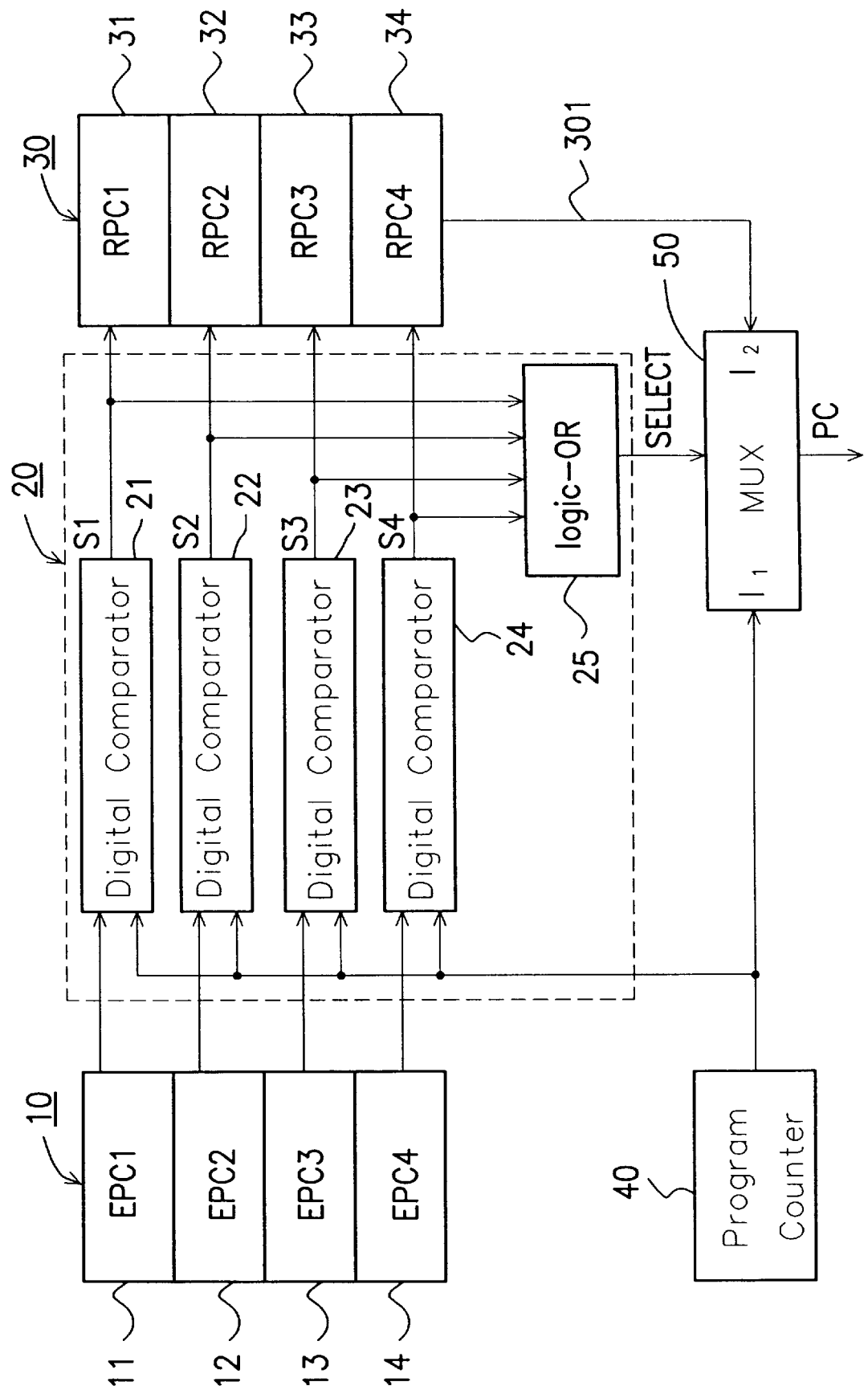
FIG. 3A shows a more detailed block structure of the program repairing apparatus shown in FIG. 2.
Figure 3B:
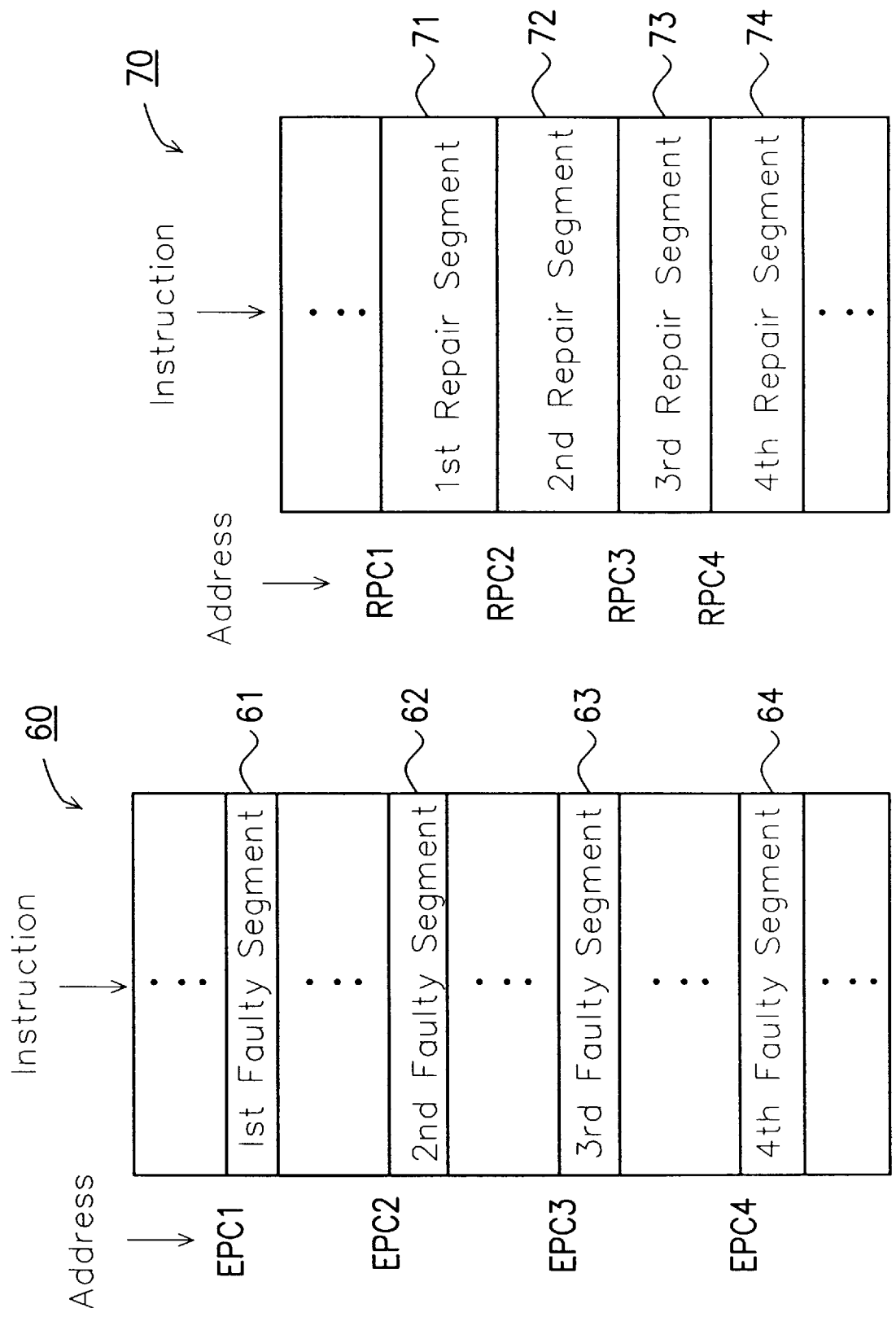
FIG. 3B is a schematic diagram used to depict how the invention can repair four faulty program segments stored in a ROM unit by the use of four repair program segments stored in a RAM unit.
Figure 3C:
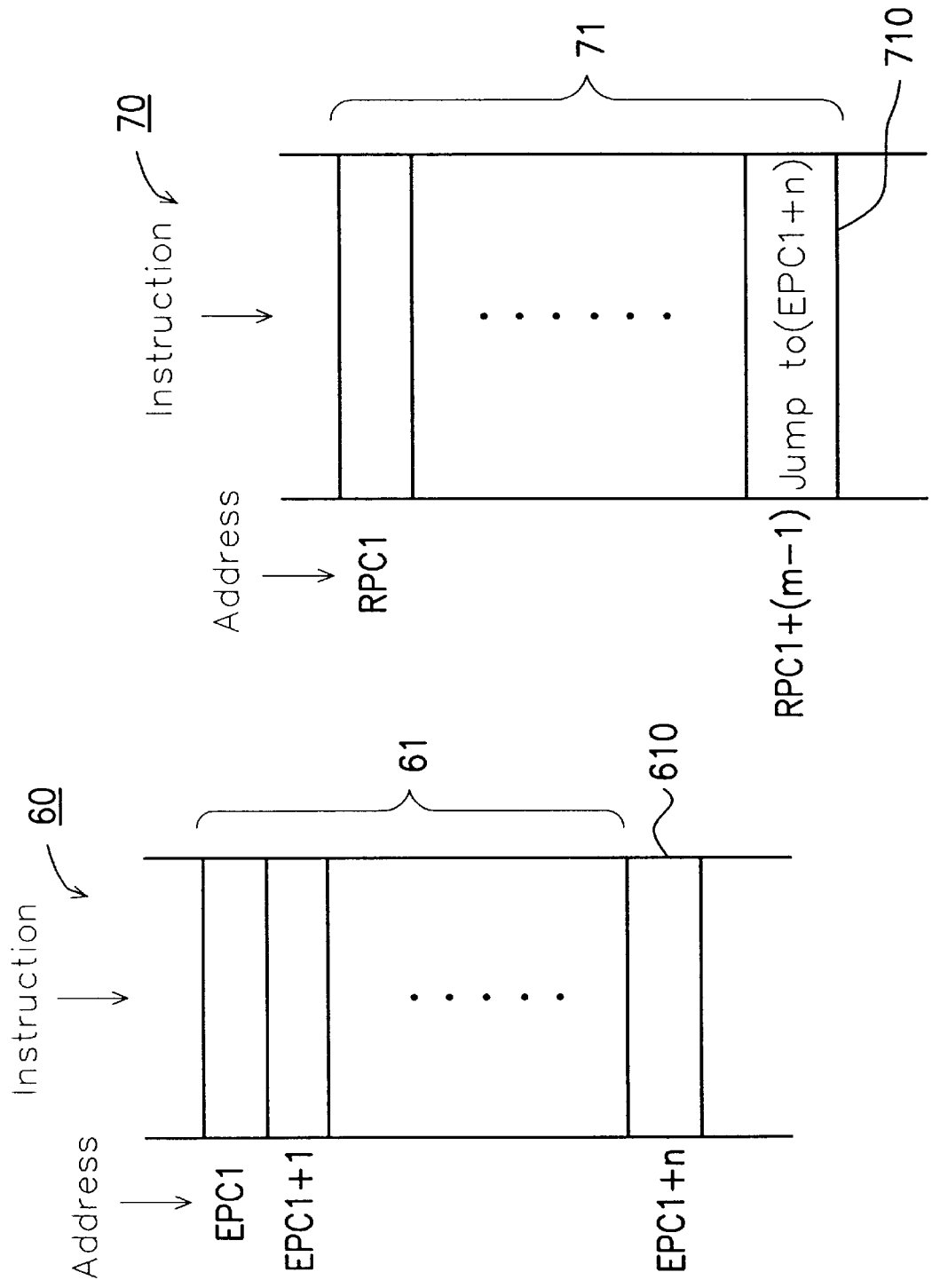
FIG. 3C is a schematic diagram used to depict the operation of the program repairing apparatus of the invention when repairing one faulty program segment in the ROM unit shown in FIG. 3B with the corresponding repair program segment in the RAM unit.

The following description will explain, with reference to FIGS. 3A through 3C, how the invention can repair a number of faulty program segments in the ROM unit 60 by using the corresponding repair program segments of these faulty program segments that are then loaded into the RAM unit 70. In this example, assume four faulty program segments are found in the ROM unit 60 which will be repaired by the use of four corresponding repair program segments. It will be understood, however, that the invention is not limited to the repairing of four faulty program segments and, broadly speaking, can be used to repair any number of faulty program segments in the ROM unit 60.

Referring first to FIG. 3B, in the following example, assume that in the ROM unit 60, there are found four faulty program segments, as respectively indicated by the reference numerals 61, 62, 63, 64. Further, assume that the starting addresses of these faulty program segments 61, 62, 63, 64 are respectively EPC1, EPC2, EPC3, and EPC4. These faulty program segments 61, 62, 63, 64 are to be repaired by using four repair program segments, as respectively indicated by the reference numerals 71, 72, 73, 74, that are then loaded into the RAM unit 70 under control by the CPU 80. Assume that the starting addresses of these repair program segments 71, 72, 73, 74 are respectively RPC1, RPC2, RPC3, and RPC4. These repair program segments 71, 72, 73, 74 are preferably loaded into a continuous section of the RAM unit 70.

In accordance with the invention, the repair work will be carried out in such a manner that whenever the embedded microprocessor system encounters any one of the faulty program segments in the ROM unit 60, the value of the access address PC will be changed to the starting address of the corresponding repair program segment in the RAM unit 70. For instance, if the current access address PC is EPC1, which is the starting address of the first faulty program segment, the access address PC will be changed immediately to RPC1. Similarly, if the current access address PC is EPC2, which is the starting address of the second faulty program segment, the access address PC will be changed immediately to RPC2; if the current access address PC is EPC3, which is the starting address of the third faulty program segment, the access address PC will be changed immediately to RPC3; if the current access address PC is EPC4, which is the starting address of the fourth faulty program segment, the access address PC will be changed immediately to RPC4. In this manner, the repair program segments 71, 72, 73, 74 stored in the RAM unit 70 can be used respectively to repair the faulty program segments 61, 62, 63, 64 in the ROM unit 60, allowing the embedded microprocessor system to run programs smoothly without causing shutdown to the system when any faulty program segments are encountered.

Referring next to FIG. 3A, when the embedded microprocessor system finds the existence of the four faulty program segments 61, 62, 63, 64 in the ROM unit 60, the CPU 80 will register the starting addresses EPC1, EPC2, EPC3, and EPC4 of these faulty program segments 61, 62, 63, 64 in the faulty-segment address table 10, as respectively indicated by the reference numerals 11, 12, 13, 14. Moreover, after the repair program segments 71, 72, 73, 74 are loaded into the RAM unit 70, the starting addresses RPC1, RPC2, RPC3, and RPC4 thereof will be registered in the repair-segment address table 30, as respectively indicated by the reference numerals 31, 32, 33, 34.

As shown in FIG. 3A, the comparison circuit 20 includes four digital comparators 21, 22, 23, 24 and a four-input logic-OR gate 25. The first digital comparator 21 compares EPC1 with the current output of the program counter 40 (i.e., the current access address) to thereby generate an output S1=1, if the comparison result is equal, and S1=0, if the comparison result is unequal. In a similar manner, the second digital comparator 22 compares EPC2 with the current output of the program counter 40 to thereby generate an output S2=1 if the comparison result is equal, and S2=0 if the comparison result is unequal; the third digital comparator 23 compares EPC3 with the current output of the program counter 40 to thereby generate an output S3=1 if the comparison result is equal, and S3=0 if the comparison result is unequal; and the fourth digital comparator 24 compares EPC4 with the current output of the program counter 40 to thereby generate an output S4=1 if the comparison result is equal, and S4=0 if the comparison result is unequal.

The conditions of S1=1 will cause the repair-segment address table 30 to put the starting address of the corresponding repair program segment (in this case, the starting address RPC1) onto the data bus 301 that is connected to the second input end $I_2$ of the multiplexer 50; the conditions of S2=1 will cause the repair-segment address table 30 to put the value of RPC2 onto the data bus 301; the conditions of S3=1 will cause the repair-segment address table 30 to put the value of RPC3 onto the data bus 301; and the conditions of S4=1 will cause the repair-segment address table 30 to put the value of RPC4 onto the data bus 301;

Meanwhile, the four-input logic-OR gate 25 takes S1, S2, S3, and S4 as inputs to thereby generate a logic-OR output SELECT. It is clear that SELECT=0 only when S1=S2=S3=S4=0, and SELECT=1 otherwise. As mentioned earlier, the condition of SELECT=0 will cause the multiplexer 50 to select the input value at its input end $I_1$ as its output (i.e., the output of the program counter 40); whereas the condition of SELECT=1 will cause the multiplexer 50 to select the input value at its input end $I_2$ as its output (i.e., the starting address of the corresponding repair program segment from the repair-segment address table 30).

In other words, during the execution of the programs from the ROM unit 60, when the output of the program counter 40 is exactly equal to any one of the address values EPC1, EPC2, EPC3, and EPC4 registered in the faulty-segment address table 10, it will cause the corresponding digital comparator in the comparison circuit 20 to output a logic value of 1 that in turn causes SELECT=1 and the repair-segment address table 30 to put the starting address of the corresponding repair program segment on the data bus 301.

For instance, when the output of the program counter 40 is equal to EPC1, it will cause the first digital comparator 21 in the comparison circuit 20 to output S1=1, thereby causing SELECT=1 and the repair-segment address table 30 to put RPC1 on the data bus 301. As mentioned earlier, the condition of SELECT=1 will cause the multiplexer 50 to select the input value at its input end $I_2$ as its output, which is in this case the starting address RPC1 from the repair-segment address table 30. As a result, the access address PC will instead take on the starting address RPC1 to thereby gain access to the first repair program segment 71 in the RAM unit 70. As a result, the decoding/executing unit 75 will execute the first repair program segment 71 in the RAM unit 70 in place of the first faulty program segment 61 in the ROM unit 60.

Referring further to FIG. 3C, assume that the first faulty program segment 61 takes up n address locations in the ROM unit 60 and the first repair program segment 71 takes up m address locations in the RAM unit 70, where n, m are both integers. The ending address of the first faulty program segment 61 is therefore [EPC1+(n−1)]; and the ending address of the first repair program segment 71 is therefore [RPC1+(m−1)]. In accordance with one aspect of the invention, the last instruction stored in the ending address [RPC1+(m−1)] of the first repair program segment 71 should be an unconditional jump to the address of [EPC1+(n)], i.e., the immediate next address to the ending address [EPC1+(n−1)] of the first faulty program segment 61.

In a similar manner, the condition of the output of the program counter 40 being equal to EPC2 will cause the embedded microprocessor system to change the value of the access address PC from EPC2 to RPC2, allowing the decoding/executing unit 75 to execute the second repair program segment 72 in the RAM unit 70 in place of the second faulty program segment 62 in the ROM unit 60; the condition of the output of the program counter 40 being equal to EPC3 will cause the embedded microprocessor system to change the value of the access address PC from EPC3 to RPC3, allowing the decoding/executing unit 75 to execute the third repair program segment 73 in the RAM unit 70 in place of the third faulty program segment 63 in the ROM unit 60; and the condition of the output of the program counter 40 being equal to EPC4 will cause the embedded microprocessor system to change the value of the access address PC from EPC4 to RPC4, allowing the decoding/executing unit 75 to execute the fourth repair program segment 74 in the RAM unit 70 in place of the fourth faulty program segment 64 in the ROM unit 60.

In conclusion, any program segments in the ROM unit 60 that need to be corrected or updated can be repaired by using modified versions of the faulty program segments (i.e., the repair program segments) which are loaded in the RAM unit 70. Since these reloadable repair program segments can be arbitrarily modified at any time, the repair work on the faulty program segments in the ROM unit 60 is easy and convenient to carry out. The embedded microprocessor system will therefore not suffer from shutdown due to any faulty program segments in the ROM unit 60. Moreover, these faulty program segments, if any, can be repaired easily simply by loading the repair program segments into the RAM unit 70, without having to replace the whole ROM unit with a new one that contains the correct programs.

As disclosed in the foregoing, the embedded microprocessor system 5 includes the faulty-segment address table 10, the comparison circuit 20, the repair-segment address table 30, the program counter 40, the multiplexer 50, the ROM unit 60, the RAM unit 70, and the decoding/executing unit 75. It is apparent to those skilled in the art of microprocessor systems that additional functional units can be incorporated in the embedded microprocessor system without departing from the spirit of the invention.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A program repairing apparatus for use on an embedded microprocessor system having a ROM unit to repair a number of faulty program segments in said ROM unit, comprising:

reloadable storage means for storing a corresponding number of repair program segments which are used respectively to repair the faulty program segments in said ROM unit;

a faulty-segment address table for registering the starting addresses of the faulty program segments in said ROM unit;

a repair-segment address table for registering the starting addresses of the repair program segments in said reloadable storage means;

a program counter for generating a sequential output of binary values serving as access addresses to said ROM unit and said reloadable storage means;

a comparison circuit for comparing the output of said program counter with each of the starting addresses of the faulty program segments registered in said faulty-segment address table; if all comparison results are unequal, said comparison circuit generating a first selection control signal; otherwise, if one comparison result is equal, said comparison circuit generating a second selection control signal and a repair-segment selection signal, said repair-segment selection signal causing said repair-segment address table to output the starting address of the corresponding repair program segment needed to repair the current faulty program segment; and a multiplexer having a first input end connected to receive the output of said program counter and a second input end connected to receive the output of said repair-segment address table, said multiplexer being coupled to said comparison circuit such that the appearance of said first selection control signal causes said multiplexer to select the output of said program counter as output while the appearance of said second selection control signal causes said multiplexer to select the output of said repair-segment address table as output; the output of said multiplexer being used as an access address to gain access to said ROM unit and said reloadable storage means.

2. The apparatus of claim 1, wherein said comparison circuit includes:

a plurality of digital comparators, each being used to compare one of said starting addresses of said faulty program segments registered in said faulty-segment address table with the current output of said program counter; the output of each digital comparator being at a first logic state if the comparison result is unequal and at a second logic state if equal; and a logic-OR gate having a plurality of input ends connected respectively to receive the output of each of said digital comparators;

wherein when the output of each of said digital comparators is at the first logic state, the output of said logic-OR gate represents the first selection control signal; whereas when the output of any one of said digital comparators is at the second logic state, the output of said logic-OR gate represents the second selection control signal.

3. The apparatus of claim 2, wherein said digital comparators in said comparison circuit are devised in one-to-one correspondence to the starting addresses of the faulty program segments registered in said faulty-segment address table.

4. The apparatus of claim 1, wherein the starting addresses of the faulty program segments registered in said faulty-segment address table are in one-to-one correspondence to the starting addresses of the repair program segments registered in said repair-segment address table.

5. The apparatus of claim 1, wherein each of said repair program segments is loaded into a continuous sequence of addresses in said reloadable storage means.

6. The apparatus of claim 1, wherein each of said faulty program segments is stored in a continuous sequence of addresses in said ROM unit.

7. The apparatus of claim 1, wherein in the repair program segments loaded in said reloadable storage means, the last instruction stored in the ending address of each of the repair program segments is an unconditional jump to an address in said ROM unit that is immediate next to the ending address of the corresponding faulty program segment.

8. The apparatus of claim 1, wherein the data stored in said faulty-segment address table, said repair-segment address table, and said reloadable storage means are written in by an on-line system controller.

9. A program repairing apparatus for use on an embedded microprocessor system having a ROM unit to repair at least one faulty program segment in said ROM unit, comprising:

reloadable storage means for storing a repair program segment which is used to repair the faulty program segment in said ROM unit;

a faulty-segment address table for registering the starting address of the faulty program segment in said ROM unit;

a repair-segment address table for registering the starting address of the repair program segment in said reloadable storage means;

a program counter for generating a sequential output of binary values serving as access addresses to said ROM unit and said reloadable storage means;

a comparison circuit for comparing the output of said program counter with the starting address of the faulty program segment registered in said faulty-segment address table; if the comparison result is unequal, said comparison circuit generating a first selection control signal; otherwise, if equal, said comparison circuit generating a second selection control signal and a repair-segment selection signal, said repair-segment selection signal causing said repair-segment address table to output the starting address of the repair program segment; and a multiplexer having a first input end connected to receive the output of said program counter and a second input end connected to receive the output of said repair-segment address table, said multiplexer being coupled to said comparison circuit such that the appearance of said first selection control signal causes said multiplexer to select the output of said program counter as output while the appearance of said second selection control signal causes said multiplexer to select the output of said repair-segment address table as output; the output of said multiplexer being used as an access address to gain access to said ROM unit and said reloadable storage means.

10. The apparatus of claim 9, wherein said comparison circuit includes a digital comparator, being used to compare said starting address of said faulty program segment registered in said faulty-segment address table with the current output of said program counter; the output of said digital comparator being at a first logic state if the comparison result is unequal and at a second logic state if equal;

wherein the first logic state represents the first selection control signal; whereas the second logic state represents the second selection control signal.

11. The apparatus of claim 9, wherein said repair program segment is loaded into a continuous sequence of address in said reloadable storage means.

12. The apparatus of claim 9, wherein said faulty program segment is stored in a continuous sequence of address in said ROM unit.

13. The apparatus of claim 9, wherein in the repair program segment loaded in said reloadable storage means, the last instruction stored in the ending address of each of the repair program segment is an unconditional jump to an address in said ROM unit that is immediate next to the ending address of the corresponding faulty program segment.

14. The apparatus of claim 9, wherein the data stored in said faulty-segment address table, said repair-segment address table, and said reloadable storage means are written in by an on-line system controller.

* * * * *